(12) United States Patent
Di Benedetto

(10) Patent No.: US 9,738,345 B2
(45) Date of Patent: Aug. 22, 2017

(54) ELECTRIC MOTORCYCLE EQUIPPED WITH SUITABLE DESIGN FEATURES FOR MAKING ITS MAINTENANCE SIMPLER

(71) Applicant: Mauro Stefano Di Benedetto, Segrate (IT)

(72) Inventor: Mauro Stefano Di Benedetto, Segrate (IT)

( * ) Notice: Subject to any disclaimer, the term of this patent is extended or adjusted under 35 U.S.C. 154(b) by 0 days.

(21) Appl. No.: 15/035,267

(22) PCT Filed: Oct. 14, 2014

(86) PCT No.: PCT/IB2014/065297
§ 371 (c)(1),
(2) Date: May 9, 2016

(87) PCT Pub. No.: WO2015/056168
PCT Pub. Date: Apr. 23, 2015

(65) Prior Publication Data
US 2016/0304151 A1    Oct. 20, 2016

(30) Foreign Application Priority Data

Oct. 18, 2013 (IT) .............................. VE2013A0055

(51) Int. Cl.
*B62K 15/00* (2006.01)
*B62M 7/12* (2006.01)
(Continued)

(52) U.S. Cl.
CPC ............ *B62K 15/006* (2013.01); *B62K 11/10* (2013.01); *B62K 25/04* (2013.01); *B62M 7/00* (2013.01);
(Continued)

(58) Field of Classification Search
CPC ...... B62K 15/006; B62K 25/04; B62K 11/10; B62K 2204/00; B62K 2208/00; B62M 7/00; B62M 7/12
See application file for complete search history.

(56) References Cited

U.S. PATENT DOCUMENTS

2011/0074214 A1 * 3/2011 Takao ....................... B60L 7/18
307/38
2012/0015221 A1 * 1/2012 Murase ............... H01M 10/425
429/90
(Continued)

FOREIGN PATENT DOCUMENTS

CN         201829585 U  *  5/2011
ES         EP 2848456 A1 *  3/2015 ............... B60K 1/04

*Primary Examiner* — Darlene P Condra
(74) *Attorney, Agent, or Firm* — R. Ruschena Patent Agent, LLC

(57) ABSTRACT

The present invention relates to an electric motorcycle realized so that it can be subjected to a simple maintenance process. Such motorcycle is realized so that all the components at major risk of failure or deterioration are grouped in an unique compact and easily removable block called "block of electric components". Moreover, the structure of the same motorcycle is conceived so that the extraction of said "block of electric components", even if it is bulky and heavy, results simple and that it is also reduced at minimum the risk that such operation occurs in an incorrect way, or that it can provide other kinds of damage. All this aims at making the motorcycle maintenance and the restoration of its full function possible also at not specialized sites.

4 Claims, 7 Drawing Sheets

(51) Int. Cl.
*B62K 11/10* (2006.01)
*B62K 25/04* (2006.01)
*B62M 7/00* (2010.01)

(52) U.S. Cl.
CPC ........... *B62M 7/12* (2013.01); *B62K 2204/00* (2013.01); *B62K 2208/00* (2013.01)

(56) References Cited

U.S. PATENT DOCUMENTS

| | | | | |
|---|---|---|---|---|
| 2012/0119749 | A1* | 5/2012 | Iida | H01M 10/441 324/435 |
| 2013/0057213 | A1* | 3/2013 | Kuraishi | B60L 3/0046 320/109 |
| 2015/0280467 | A1* | 10/2015 | Matsuda | B62K 11/04 307/10.1 |
| 2015/0329004 | A1* | 11/2015 | Sakai | B60L 11/1818 701/22 |

* cited by examiner

ELECTRIC MOTORCYCLE EQUIPPED WITH SUITABLE DESIGN FEATURES FOR MAKING ITS MAINTENANCE SIMPLER

BACKGROUND OF THE INVENTION

1. Field of the Invention

The application field of the present invention relates generally to the improvements of electric motorcycles.

In particular, the invention relates to a preferred embodiment of an electric motorcycle model provided with particular structural features which make said motorcycles maintenance easier and more efficient.

2. Brief Description of the Prior Art

Generally, the supply of electric vehicles has recently remarkably increased mostly caused by the increasing cost of internal combustion engines fuel, and above all, by the will of reducing the emission of carbon dioxide and other pollutants produced by the internal combustion engines, which represent a serious cause of air pollution, a phenomenon, that everyone wants to be rapidly resolved.

Therefore, the evolution of supply of traditional vehicles towards electric vehicles should be a trend destined to strengthen, although there are still many difficulties which impede its development.

In particular, the more important technical problems are here summarized:
- the development and deployment of more efficient and economic energy storage technologies,
- the charge management systems of said systems,
- the electronic controls needed for an effective vehicle functioning and
- the general supply and maintenance processes.

Concerning the other technical components needed for manufacturing electric vehicles, there seems not to be particular problems. In fact, regarding the electric motors, it is possible to rely on very mature technologies able to work in operative conditions required by the transportation sector. While considering the low power mechanic and electric need by electric vehicles, it is possible to adapt the huge state of the art developed for the traditional vehicles without particular difficulties.

What is generally stated for the electric vehicles, it can also apply to the electric motorcycles; but, in this case, there is another problem due to many space limitations.

In fact, for traditional motorcycles, the fuel tank can have various shapes and can be almost mounted in any position. The motor as well can be positioned almost anywhere since the transmission occurs through a chain (or other transmission mechanisms) which can transmit the motion to the driving wheel at various distances.

Generally, it can be stated that in the traditional motorcycles, the key systems for the motorcycle operations are positioned in a distributed way over the entire motorcycle, and the limits are mainly due to aesthetic or maneuverability reasons.

Another prerogative of the traditional motorcycles is that the expertise needed for the maintenance of these kinds of motorcycles is very diffused. In fact, it is very easy to find a motor mechanic able to understand the cause of possible malfunctioning and to carry out the main maintenance operations of a traditional fuel supplied motorcycle. Therefore, the electric motorcycles are characterized by some important differences with respect to the traditional supplied motorcycles.

Obviously, the electrically operated motorcycles do not need a tank for the fuel, and the energy needed for the locomotion is obtained by batteries which are much bulkier than the batteries provided for traditional motorcycles because these batteries need to support low consumption functions. Moreover, for technical reasons, such batteries cannot be shaped as gasoline tanks. For economic reasons as well, the battery (or batteries) shape represents a limitation to the motorcycle design conception.

In addition to the battery shape, which is generally a parallelepiped box, another design limit is also the fact that the battery is to be suitably protected and isolated, both for protecting it against possible damage and for protecting the motorcycle user against possible accidents. Also, the electronic subsystems of electrical motorcycles are much more complex since, in addition to the electric loads provided for the traditional motorcycles, the electronic subsystem is needed to manage power loads associated to the electric motorcycle operation.

These electronic subsystems are designed also to control the battery charge steps. In general, the more precise is the control of the batteries charge and discharge, the greater is the number of charging/discharging cycles that a chemical battery can do with acceptable performance and yield. To increase the motorcycle autonomy, more batteries are available that have possible different degrees of wear and charge states, causing the function of the battery control to be yet more delicate and critical. For these reasons, the electric motorcycles are provided with a subsystem, called BMS (Battery Management System), which is carried out by a microprocessor board which supervises these functions. The BMS is a quite critical element, from the reliability point of vue, since it is provided with both a pure computational electronics and power electronics since it needs to manage the relatively high energies stored inside the accumulation systems (or batteries).

Moreover, in addition to the traditional electronic control unit needed for controlling the electric power typical of a vehicle (for example for lighting), there is a need of a power control unit (which is generally distinct from the traditional electric control unit) for controlling the electric energy provided to the motor (for example for accelerating) or for managing the energy recovery during decelerations.

Also, the power control unit is a very stressed subsystem which can be subjected to failures and malfunctioning.

These considerations about the electronics for electric motorcycles are aimed to confirm that the electronics of an electric motorcycle are more complex than the very simpler one of a traditional motorcycle.

As a consequence, nearly all failures or malfunctioning of electric motorcycles are caused by batteries deterioration or to a malfunctioning of the electric and electronic subsystems needed for the functioning of an electric motorcycle: in particular the BMS subsystem and the power control unit.

Because of the complexity of the onboard electronics of an electric motorcycle, it is even more complex in case of failure or malfunctioning to be diagnosed than with a traditional motorcycle as well, and basically, a complete and precise maintenance service can only occur at specialized computerized work stations for carrying out diagnostic tests, and these work stations can be available only in specialized sites dedicated to these functions; and, of course, these sites cannot be diffusely distributed as well as the traditional ones.

Generally, yet as a consequence of what previously stated, in most cases, the failures occurring to electric motorcycles are resolved by substituting a failing component.

As previously stated, the needed expertise for maintenance and repair of electric motorcycles is not so diffused as the one for maintenance and repair of traditional motorcycles, and, given the technical peculiarities associated to electric motorcycles, it is expected that the maintenance network of such means is articulated on two levels, wherein the most precise diagnostics is carried out at a strongly centralized level (concentrated in few or very few sites).

Many electric motorcycles available on the market are the evolution of traditional motorcycles, and the criteria used for providing the frames are possibly derived by the various frame kinds yet available in the mature field of traditional motorcycles.

Therefore, the current electric motorcycle is provided in diffused models in which, after adopting a kind of frame inspired by traditional shapes, technical attempts have been made to mount the battery (or batteries) and the various electronic components inside available spaces: so, the batteries are generally arranged inside the greater and more protected space among the available ones, while the various electronic components, smaller and often with less shape limits, are arranged in distributed way in the more suitable spaces according to the various models.

The electric motorcycles currently have on the have their operating elements arranged in different positions and are provided with different access points for their removal.

Another prerogative of the electric motorcycles is that electric motors can be more compact than the internal combustion ones, and that they can also be directly integrated with the driving wheel, thus avoiding the need of a transmission system for transmitting the motion from the motor to the wheel, since the rotary motion is generated on the same wheel.

It is to be said that the electric motor technology is particularly mature and reliable, and therefore the motor failures are to be considered a very rare (almost minor) event with respect to the failures the other electric and electronic subsystems can be subjected to.

The possibility to integrate the motor directly in the driving wheel, as said, eliminates the need of a transmission system and, as a consequence, eliminates the limit (like in the internal combustion engine motorcycles which need a transmission system, for example a chain) to preserve a free space between the motor and the driving wheel, thus eliminating portions in movement subjected to wear and in need of lubrication, as one of the causes for which maintenance is required in the traditional motorcycles.

Still concerning the evolution trend of electric motorcycles it is observed how, in many models, attempts were made to provide motorcycles in which the battery removal is simplified, and doable by their users.

This trend is justified by the fact that the charge times for a battery are not comparable to the fuelling times of a traditional motorcycle, the battery recharge times being very much longer.

It was then considered that the replacement of an exhausted battery with a charged one could be an alternative solution to recharging time in order to speed up the procedure comparably in time to fuelling.

Generally, the possibility to extract the battery allows providing more flexible supply procedures: for example if the motorcycle is parked in a place not prepared for recharging, the motorcycle user can extract the battery and bring it to a place where it is possible to recharge it. Regardless of the effective application of these procedures, all most recent models of electric motorcycles are have one or more batteries housed in spaces accessible by their users as well, who, at least theoretically, should be able to remove the so called "battery pack".

This structural feature of the most recent electric motorcycles seems not to be really useful since there are not so many users of electric motorcycles, who after parking their vehicle, remove the "battery pack" in order to substitute it or bring it to a suitable place for recharging. The little success of these procedures can be justified by the fact that there are not yet diffused standards allowing an efficient battery substitution and recharging in suitable service stations.

However, it is also possible that the removal operation of a "battery pack", which is generally very heavy, is an extremely uncomfortable operation for the user. Moreover, the more the "battery pack" light is, the smaller the autonomy is that said batteries can ensure, and so the maneuverability of the battery is a balancing point against the battery's autonomy, which is certainly more important.

Generally, the user needs an ever greater autonomy, and this leads to bulkier and heavier batteries, ever less suitable to be regularly handled by the same user.

Considering the limits of autonomy which can be reached by electric motorcycles, and their battery volumes and weights, it is obvious to aim at providing means for providing a typical daily usage (commuting to work journeys or similar), with a sufficient autonomy. In this kind of usage, it would be desirable recharging the batteries in a service station, without the need to remove the battery.

In this case, which can be considered as a reference to define structural and performance goals, it seems that the easiness to remove the battery pack by the user is not a particularly important aspect. Another typical case of usage is the one of electric motorcycle fleets, which can be used for urban services (for example mail delivery services). Also in these cases, the motorcycles are subjected to a daily typical regular usage which comprises also long stop times; therefore also in this case, the main requirement is not represented by the maneuverability of the battery, but consists in the possibility to ensure an autonomy able to cover the typical need of a work shift. All these considerations about the electric motorcycle features, according to the known art, allow to address a technical problem still felt in many electric motorcycle usages: it is a question of ensuring an efficient maintenance of such means while considering that a network of service stations suitable for said maintenance cannot be capillary, and that the times and repair costs need to be the lowest possible.

SUMMARY OF THE INVENTION

Aim of the present invention is to provide an electric motorcycle in which failures or malfunctioning can be managed at not specialized or equipped sites, including diagnosing a failure or malfunctioning. Typically, such repair operations are usually possible only at a dealer.

Another aim of the present invention is to make easier and more efficient a maintenance procedure of these electric motorcycles providing a first level of maintenance with a capillary diffusion of very fast service without particular expertise or equipment required, and a second level, very centralized, where work can be at a slower pace to diagnose failures or malfunctioning and provide repair without the user being penalized by long waiting times and high repair costs.

Finally, another aim of the present invention is to improve the electric motorcycles maintenance logistics considering that it is not convenient to keep a great stock of most expensive replacement parts. These and other aims are reached by providing an electric motorcycle in which at least the "battery pack", the "BMS (Battery Management System)" and the "power control unit" are rigidly connected and form a unique "block of electric components" characterized in that said "block of electric components" can be removed from said electric motorcycles while maintaining its internal connections among its rigidly attached components.

The main advantages of the present invention is that the electric motorcycle made according to the teachings of this invention, and better described in the following, satisfies all the aims it was conceived for; more precisely, all the failures or malfunctioning due to the subsystems mainly subjected to criticalities can be fixed with a simple procedure of substitution of a single rigid block, without the need of a precise diagnosis about the nature of the problem. Said substitution, even if, in general, is not an operation that any user can perform easily, is however simple enough, and it can be carried out without the need of particular equipment or significant expertise.

Moreover, the block extracted in order to be repaired, even if it is heavy and bulky to be manipulated by a general user, however, can be easily managed from a logistic point of view, and it can be shipped without particular urgency to a specialized maintenance service center, where the repair can occur accurately substituting just the specific component (or components) responsible for the failure or the malfunctioning.

Such invention has also further advantages which will be more clear from the following description, the appended claims, which make up an integral part of the same description, and from the illustration of a practical embodiment described as a way of not limiting example in the following and in the appended drawings, in which:

DETAILED DESCRIPTION OF THE PREFERRED EMBODIMENTS

Figure 1:
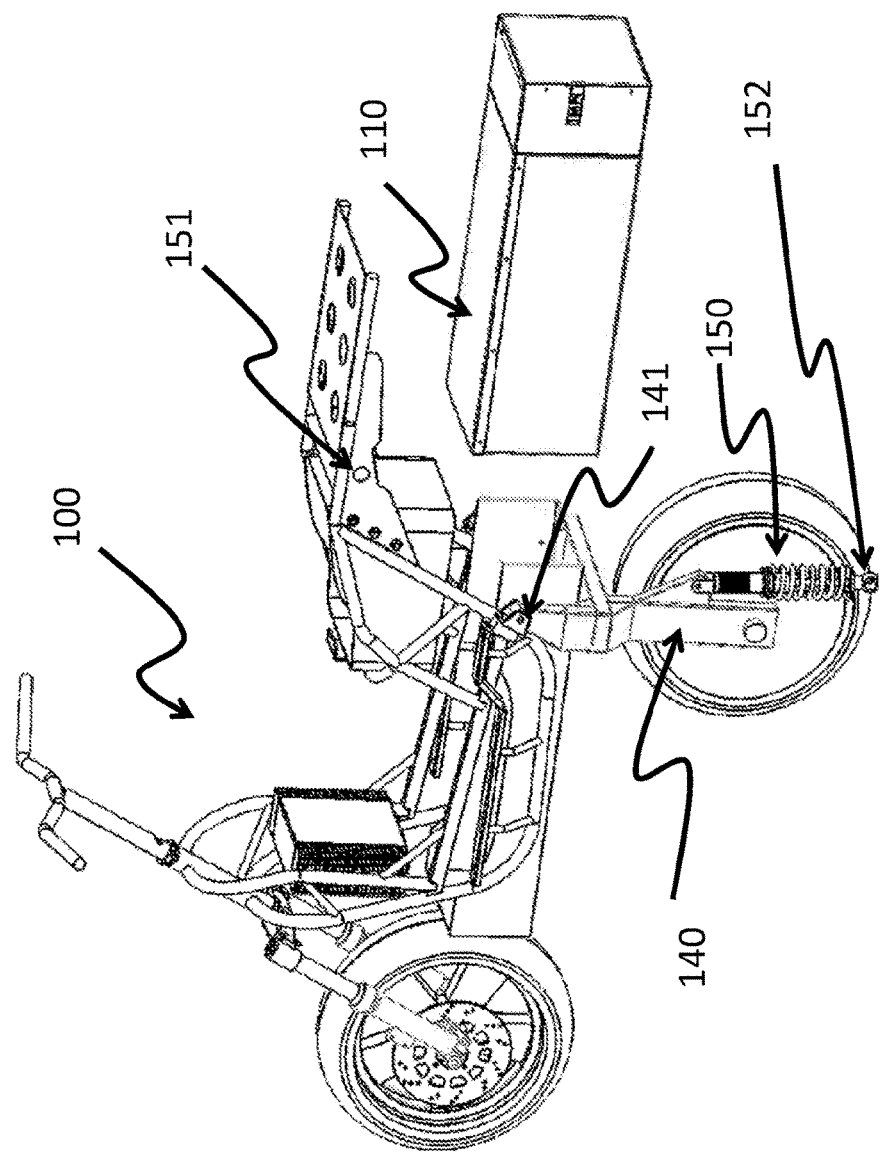
FIG. 1 shows a view of a motorcycle according to the invention, in "open" position, suitable for removing the "block of electric components", which is represented extracted from the motorcycle.

In FIG. 1, indicated with the reference number 100, it is represented an electric motorcycle in which there are highlighted some essential elements, and it is instead "free" of other elements (as for example the fairing) and accessories not essential to show the present invention. In particular with the number 110 it is indicated a particularly bulky but rigid and compact element. Such element 110 is the "block of electric components" and is shown outside the motorcycle 100.

The "block of electric components" 1-10 can be extracted from the motorcycle 100, by taking it out from its housing, thanks to the fact that the motorcycle 100 is provided with a rear fork, indicated with the number 140, which can rotate around the constraint, indicated in FIG. 1 with the number 141, which keeps it coupled to the frame. Therefore, thanks to the rotation of the fork 140 around the constraint 141, it is possible to lower remarkably the motorcycle rear wheel, so that a sufficiently great passage is provided to take out the "block of electric components" 1-10 which, during the normal functioning of the motorcycle 100, is housed in a compartment obtained in the lower portion of the motorcycle 100.

In FIG. 1, indicated with the number 150, it is also highlighted the rear suspension of the motorcycle 100. Said suspension 150 is represented with a free end 152. In fact, when the motorcycle 100 is in "open" position, suitable for removing the "block of electric components" 1-10, the suspension 150 has to be excluded from its nominal function which is that to maintain the rear wheel in the correct position suitable for driving. So, in the example of FIG. 1, the rear suspension 150 is represented decoupled from the constraint, represented with the number 151, which is on the frame of the motorcycle 100. By decoupling the end 152 of the rear suspension 150 from the constraint 151, the suspension, remains solely constrained to the axis of the rear wheel, then it is free to rotate and allows the rotation of the fork 140 as wells in order to provide the passage needed for removing the "block of electric components" 110.

Figure 2:
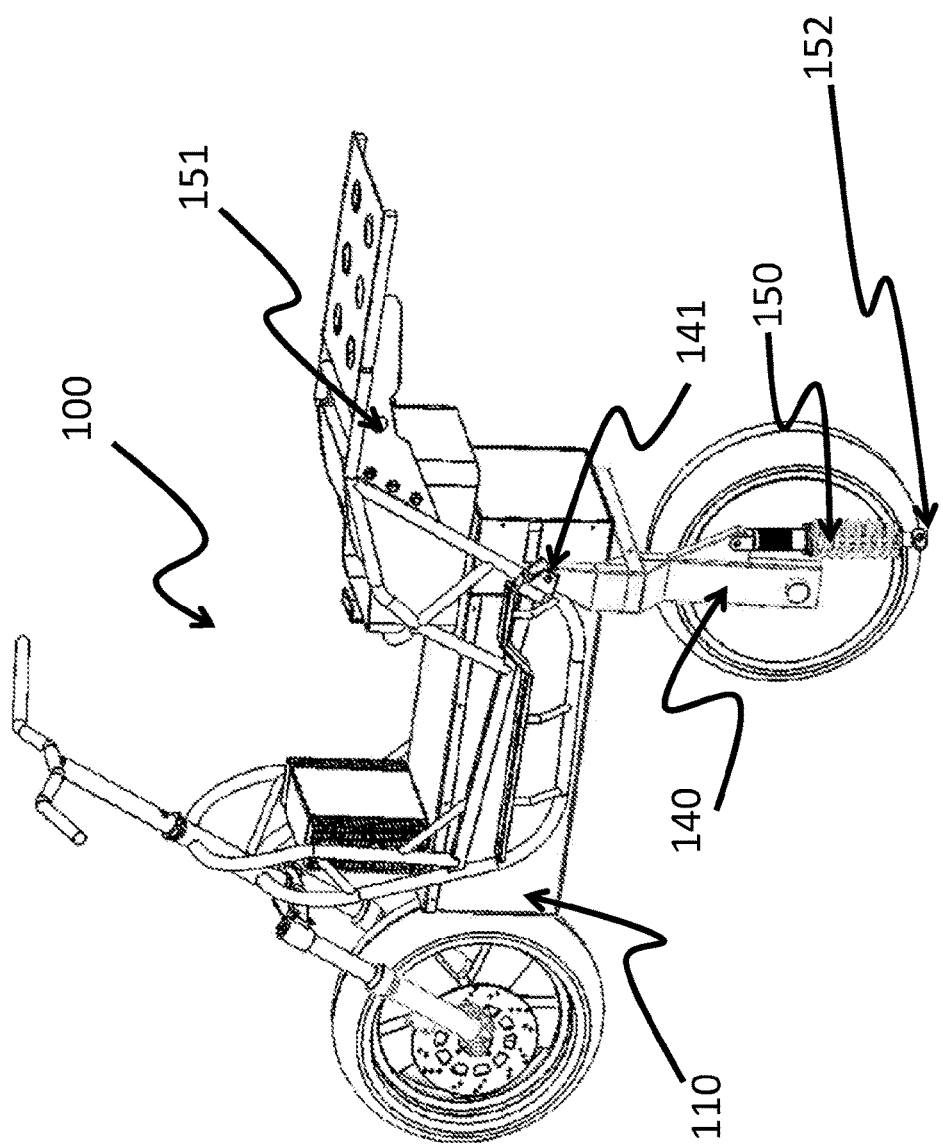
FIG. 2 shows the same view of a motorcycle according to the invention, in "open" position, where the "block of electric components" is instead represented inserted inside the motorcycle.

FIG. 2 is very similar to FIG. 1, in fact the motorcycle 100 is represented in the same view and in the same position of FIG. 1, with the only difference that the "block of electric components" 1-10 is housed in the position of normal functioning.

Figure 3:
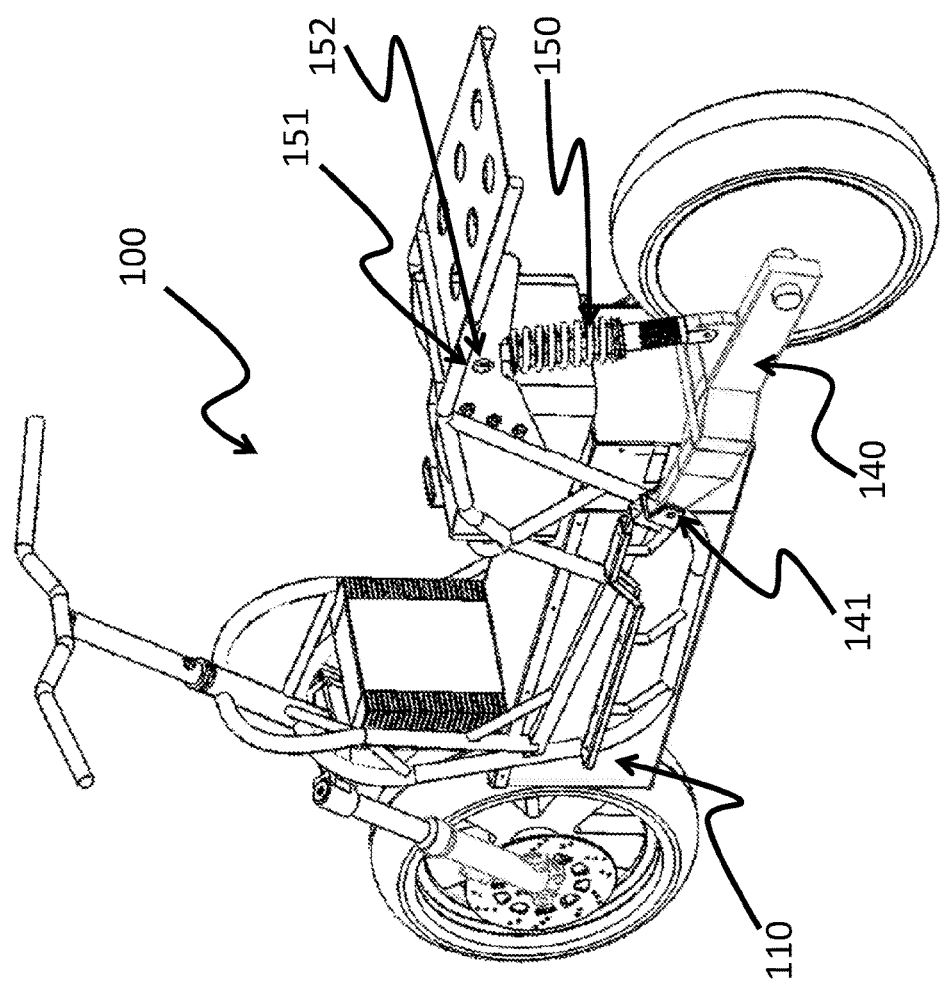
FIG. 3 shows a view of the motorcycle according to the invention, in "closed" position, with the "block of electric components" inserted inside the motorcycle; therefore in the position of normal usage.

Therefore, the sequence of FIGS. 1 and 2 helps to visualize the movement needed to remove the "block of electric components" 1-10. FIG. 3 shows the motorcycle 100 in "closed" position, i.e. in the position assumed during its normal functioning. In such position, the rear suspension 150 has its end 152 coupled to the constraint 151 arranged on the frame of the motorcycle 100, while the rear fork 140 is rotated so as the rear wheel is in the correct position for the motion. In this configuration, the suspension 150 can work correctly to absorb possible unevenness of the road occurring during the drive. It has to be noted how the junction arranged on the constraint 141, which connect the fork 140 to the frame, has a double function: in "opening" position it allows to shift, by lowering it, the rear wheel enough to remove the "block of electric components" 1-10, while in "closed" position it allows the rear suspension 150 to work correctly allowing the movement of the rear wheel.

From the view of FIGS. 1, 2 and 3 it can be easily assumed the operative mode with which the "block of electric components" 1-10 can be removed and substituted, but above all it can be appreciated the easiness of the operation. In fact, it is sufficient to lift the rear portion of the motorcycle 100 (for example by pulling it upwards by means of a hook or arranging it on a suitable trestle), thereafter the upper end 152 of the suspension 150 is decoupled from the constraint 151; at this point, the rear fork 140 is free to rotate and the rear wheel to shift downwards thus providing a great passage easily accessible by an operator, who can simply take out the "block of electric components" 1-10 and substitute it, in case of need, with another functioning "block of electric components". The motorcycle 100 is then assembled again in its configuration of normal usage, re-arranging the rear wheel in its drive position and re-coupling the end 152 of the suspension 150 to the constraint 151.

The example shown by means of the figures provides that the rear suspension is decoupled in its upper constraint arranged on the frame, but it is clear that the inventive concept is not limited to such choice. What is really important is that the rear suspension is excluded to allow the rear fork to rotate and to allow the rear wheel to be shifted from its normal position, which would prevent from accessing, from the rear, to the lower portion of the motorcycle. Therefore, it makes no difference the mode how the rear suspension is decoupled, for example the lower end could be decoupled, and the suspension could remain hanged to the frame. They have also to be considered the cases in which the rear suspension is realized with mechanic modes different from those traditionally diffused: the inventive concept has to be interpreted in a more general way, considering an electric motorcycle 100 in which the rear suspension can be somehow (according to how said suspension is mechanically realized) excluded from its main function to allow the rear wheel to be lowered in such a position that the access to the lower portion of the electric motorcycle 100 is not obstructed from the rear. Obviously, the rear suspension according to the teachings of the present invention, besides not being opposed to the rotation of the rear fork, has also to be suitably positioned itself, so that it is not an obstacle for the access to the lower portion of the electric motorcycle 100 from the rear. Therefore, the mechanic configuration of the rear portion of the electric motorcycle 100 shown in figure is certainly a configurations with many structural advantages, and it results very useful to describe the inventive concept, however it has to be considered just one of the various possible mechanic configurations, which allows to implement the inventive idea.

The rear extraction of the "block of electric components" 110 is very efficient and simple because, if carried out according to the teachings of the present invention, it does not require particular equipment (only a trestle, or a hook to which the rear portion of the motorcycle 100 has to be hanged to be lifted as much as it is needed for lowering the rear wheel) and does not require to disassemble motorcycle portions. It is however possible to prepare the motorcycle 100 also allowing the substitution of the "block of electric components" 100 from above or under the motorcycle 100.

Figure 4:
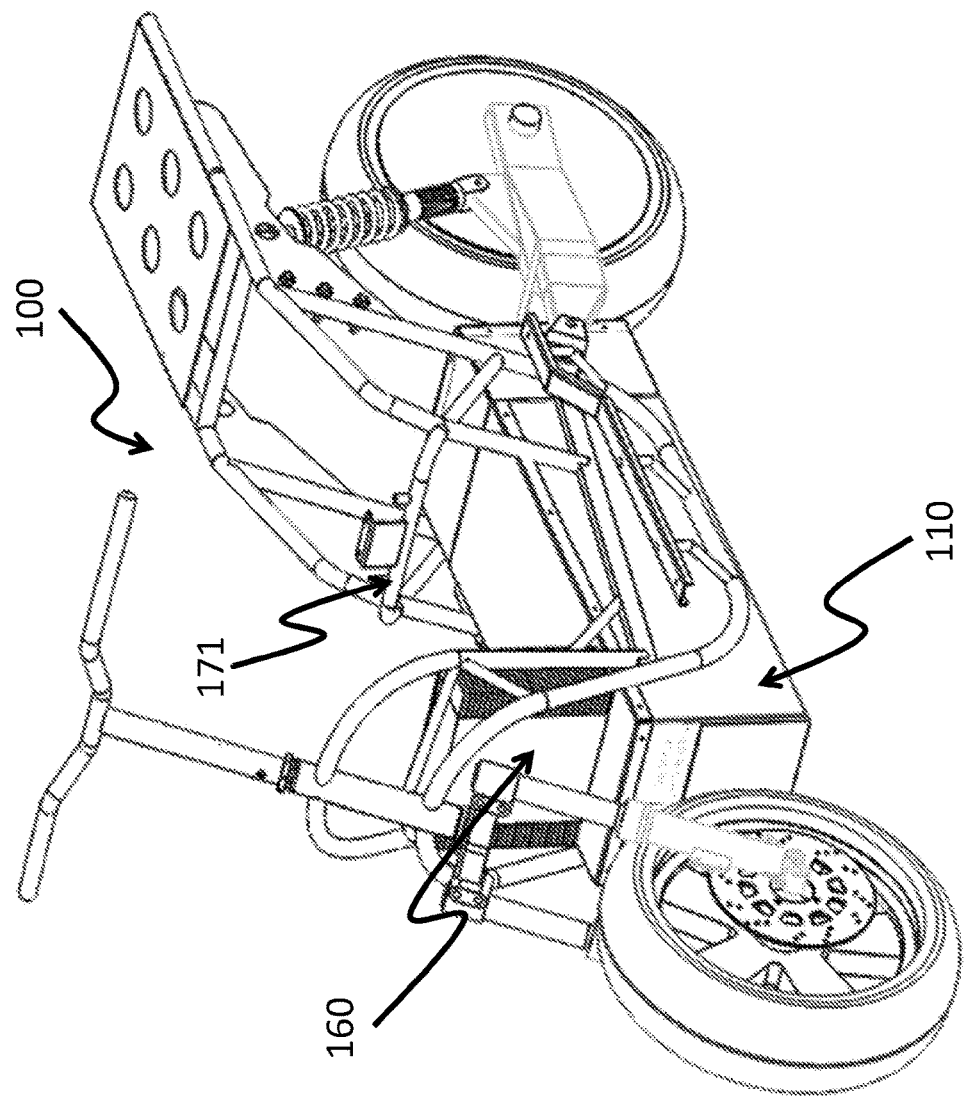
FIGS. 4 and 5 show a view of a motorcycle according to the invention, from a perspective which allows to see the obstacles in case of an eventual extraction from above of the "block of electric components"

On FIG. 4, it is represented a view of the motorcycle 100 which shows the extraction mode of the "block of electric components" 110 from above.

It is clear that, in order to carry out the extraction of the "block of electric components" 1-10 from above, it is needed at least to remove the plastic covers which coat the frame and which are indispensable to protect the "block of electric components" 1-10 itself. Moreover, FIG. 4 also highlights other elements of the motorcycle 100 which can be disassembled to carry out the operation in safety: for example, with the number 160 it is represented the radiator, and with the number 171 a frame stiffening element, but it is clear that also other elements could be removed to provide a sufficient passage for the extraction of the "block of electric components" 1-10 or solely to avoid that, during the extraction operation (it is not to be ignored that the "block of electric components" 1-10 is particularly heavy), something is damaged, for example the motorcycle saddle.

Figure 5:
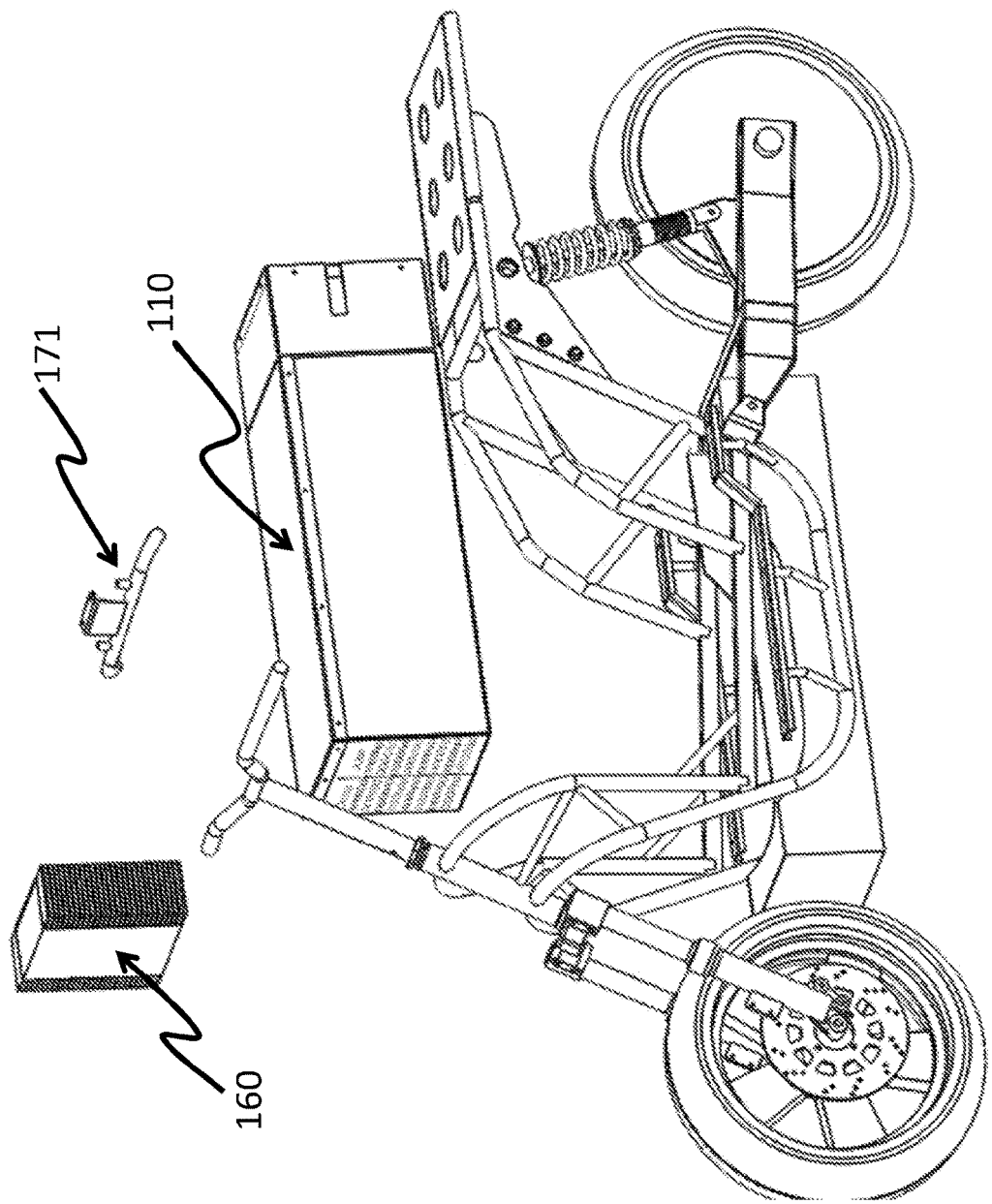

On FIG. 5, the electric motorcycle 100 shown in the example of FIG. 4 is represented after the extraction of the "block of electric components" 1-10; and in the example of FIG. 5 it is highlighted how it is needed to disassemble the radiator 160 and the stiffening element 171 of the frame as well.

It is also teorically possible the extraction of the "block of electric components" 1-10 from under the motorcycle 100. In this case, it is clearly needed to lift the motorcycle 100 so that it is possible to work comfortably also from under; moreover, it is to be provided a lower body which can be disassembled and sufficiently robust to sustain and protect, when it is closed, the "block of electric components" 110; moreover, the closure mechanisms have to be reliable enough to minimize the risk of accidental opening, and have to be of easy maintenance since positioned necessarily in a point subjected to be rapidly dirtied.

Figure 6:
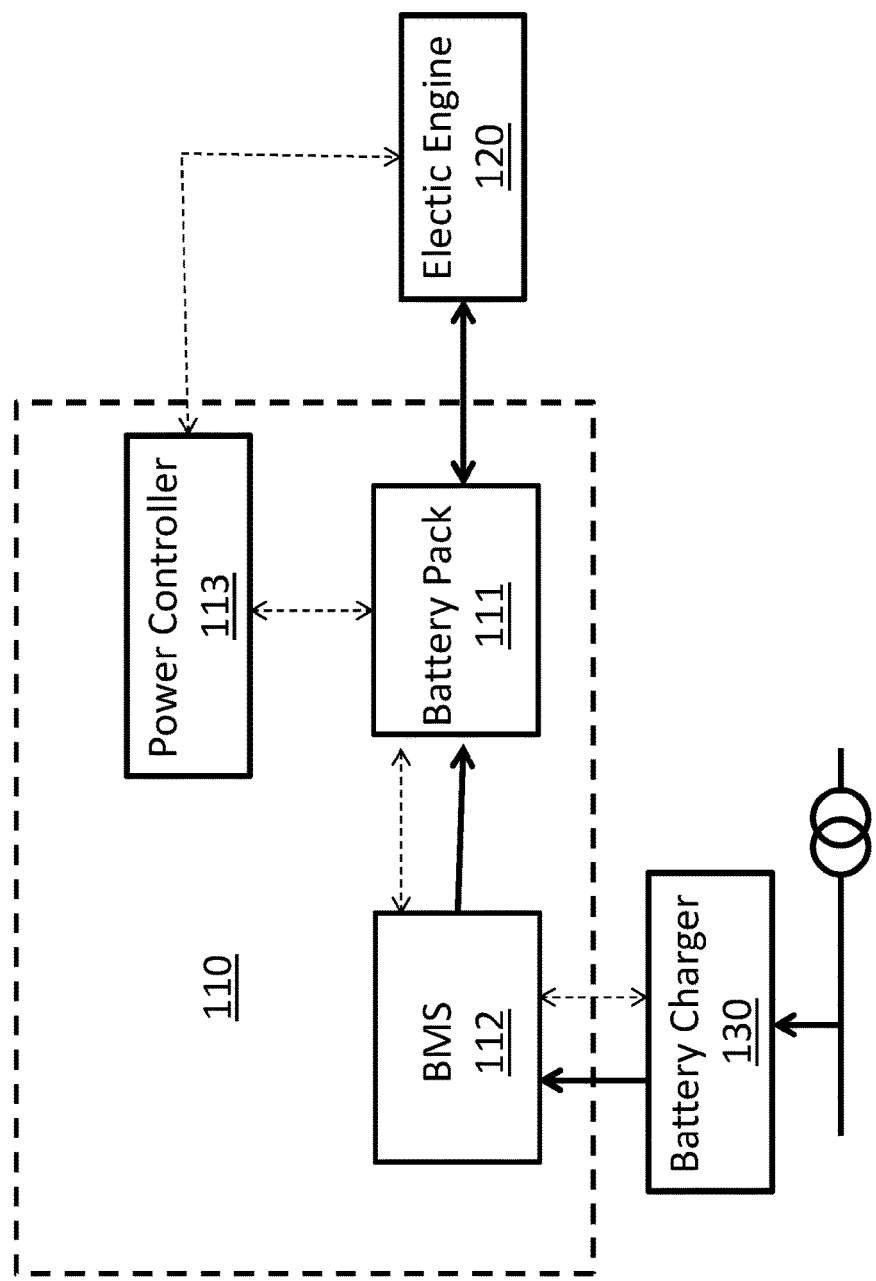
FIG. 6 shows a simplified block diagram of the main electric and electronic components which are essential for the motion of the electric motorcycle.

FIG. 6 represents a simplified block diagram which allows to synthetize the main functions to be carried out by some important electric and electronic components provided in the motorcycle 100. The arrows in continuous line indicate the energy flows, while the arrows in dashed line indicate the flows of information and command exchanges between the various components considered.

With the number 130, it is indicated the battery charger block. The function of the battery charger 130 is to absorb electric energy from an outer source, which can be the power mains, and to carry out convenient current, tension and regime transformations, which are necessary to transfer the electric energy to the battery pack, indicated with the number 111. Generally, the battery pack 111 is made up of a plurality of accumulation modules, and each accumulation module is subjected to charge and discharge cycles, deteriorating it. In order to preserve the efficiency and the duration of the accumulation modules it is important that the charge cycles are carried out observing suitable tension and current profiles and that also the temperature of any single module is controlled to avoid, for example, an excessive overheating which would damage them. From these simple considerations it results clear that the performances, the efficiency and the duration of the battery pack 111 need a specific control of the charging processes which is carried out by the component called BMS (Battery Management System) represented in FIG. 6 with the number 112. The BMS 112 provides to transmit in a controlled way the energy coming from the battery charger 130 to the single accumulation modules of the battery pack 111; and it exchanges information and commands with the battery charger 130 and with the battery pack 111.

Still in the block diagram of FIG. 6, with the number 120 it is represented the electric engine block. Naturally, the electric engine 120 has to be supplied by the battery pack 111; however, said supply needs to be regulated according to the power to be fed to the electric motor 120, for example to accelerate or slow down the drive. Moreover, during the deceleration also a recovery of the kinetic energy has to be managed. These simple considerations have been reported in order to make clear the need for suitable controls also to supervise the supply of the electric engine 120; and such controls are logically carried out by means of the functional block represented in FIG. 6 with the number 113 and which, in the most common embodiments, are carried out by a power control unit. In order to carry out its functions the power control unit 113 has to exchange data and commands at least with the battery pack 111 and with the electric engine 120.

The BMS 112, the battery pack 111 and the power control unit 113 can be assembled together in a macro-block, called "block of electric components", represented in FIG. 6 with the dashed line and indicated with the number 110. It is clear that, by integrating in one block three elements, which normally are separated, and maintaining them rigidly connected, both the power connections and the data connections can be simplified and conceived to be disconnected only in precise conditions, and not for the normal maintenance.

Figure 7:
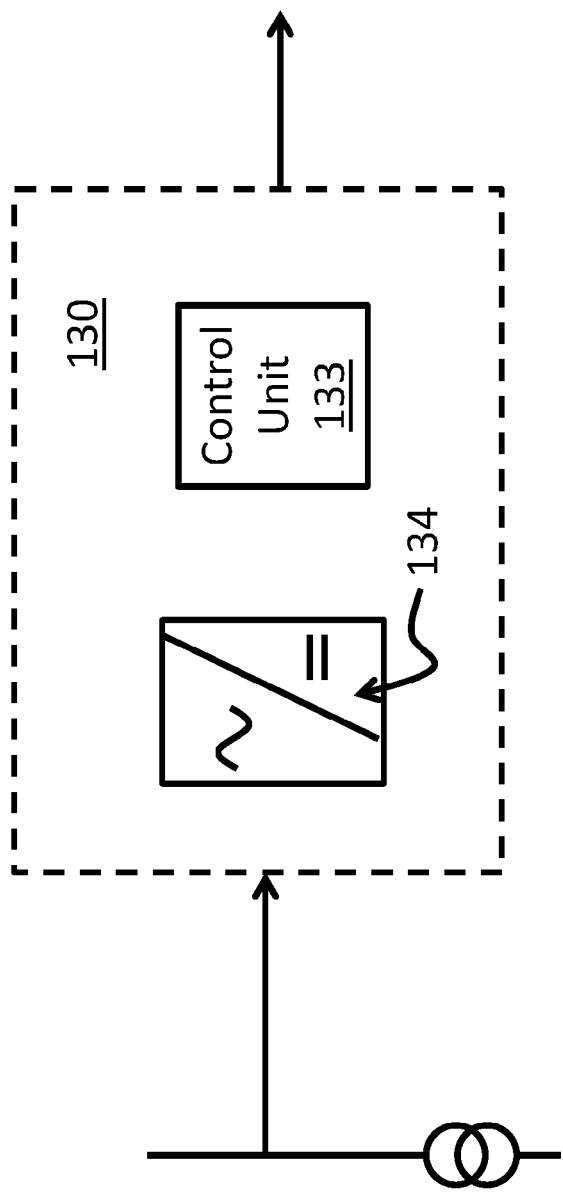
FIG. 7 shows a simplified block diagram of a typical battery charger subsystem for applications on electric motorcycles.

FIG. 7 shows instead in greater detail the battery charger 130, which in FIG. 7 is represented with a macro-block in dashed line. In particular, there are indicated two fundamental elements typically provided in the battery chargers used in the electric motorcycles, i.e. a transformation element, indicated with the number 134, and a control unit, indicated with the number 133, which supervises the transfer of power towards the load, and which exchanges information, as in the case of the present example, with the BMS 112.

In the preferred embodiment of the present invention the whole battery charger 130 is not considered part of the "block of electric components" 1-10 since the battery chargers are considered extremely reliable elements and not subjected to failures, however it is clear that there could be greater integrations and also the control unit 133 could be integrated into the "block of electric components", leaving only the transformation element 134 outside said block.

The basic concept of the present invention consists in grouping in a compact block, optimized for its logistic management, the electric and electronic components which are typically subjected to failures in electric motorcycles, and whose diagnostics is particularly complex and may require specific equipment. It is clear that, not departing from the scope of the invention, there can be integrated, in addition to the BMS 112, the battery pack 111 and the power control unit 1-13, also other electric elements. For example, by being inspired by FIG. 5, it can be possible to integrate the whole or part of the battery charger 130, or there can be integrated other elements of the low power electric subsystem of the motorcycle.

Moreover, in the "block of electric components" 1-10 there can be integrated not functional but protective elements, as for example, fuses and relays.

Finally, depending on the elements integrated in the "block of electric components" 1-10, there would be provided the suitable inner wiring inside the "block of electric components" 1-10 and the outer connections. Concerning this last aspect, it is to be observed how a connector (or system of connectors) optimized to simplify the removal and the repositioning of the "block of electric components" 1-10 should be conceived; this is again in the perspective of making as easy as possible the operation of substitution of the "block of electric components" 1-10, so as it can be carried out by a little expert user, and without the risk that such extraction and restoration operations can cause breakings or incorrect connections.

Previously, there have been reported examples about how in the "block of electric components" 1-10 can integrated more and more elements of the motorcycle 100, but, obviously, said "block of electric components" 1-10 can also be conceived in reduced way. For example, whenever the power control unit 1-13 results, in future, sufficiently reliable so that it does not need to be integrated in the "block of electric components" 1-10, the present invention could be applied considering a reduced "block of electric components" 100, and made up solely of the BMS 1-12 and the battery pack 111 equipped with suitable wiring, connections and protection circuitry. As already said, the "block of electric components" 1-10 comprises in a unique macro-block a plurality of elements, which are normally positioned in different points of the electric motorcycle 100; and since they are grouped, such elements can be suitably manipulated all together without being disconnected with respect to each other. It is thus clear that the "block of electric components" 1-10 has to provide also a mechanic frame which ensures that all the elements thereof maintain their reciprocal positions unchanged. This can be obtained collecting all the elements by means of a rigid structure which contains them, to which each element should be rigidly fixed, or realizing on the body of each element rigid mechanic connections (for example by fixing two elements with respect to each other by means of screws), or using a combination of such methods.

It is ultimately clear that further variants can be made by the expert in the field without departing from the scope of the invention as claimed. It is also to be noted that the realization of an electric motorcycle 100 with the structural feature above described, besides easing maintenance, allows also important optimization for the logistic and distribution of such vehicles.

In fact, the "block of electric components" 1-10 represents also the most expensive portion of the whole vehicle and the most delicate one to be stored. In particular, the "battery pack" 1-10 is better preserved at controlled temperatures and however it is not convenient that the batteries are stored for long periods without being subjected to controlled charge and discharge cycles. Electric motorcycles 100 according to the present invention allow to set up particularly efficient distributing processes towards the sales points; in fact, there can be organized shipments of great quantities of motorcycles free of the "block of electric components" 100. In this way, the shipment costs are saved thus maintaining low the storage costs (since the value of the "block of electric components" is not immobilized) and the motorcycles can be kept also in not conditioned boxes. The "blocks of electric components" instead can be shipped with different channels: upon order or maintaining very little stocks of "blocks of electric components" at the sales points to ensure a prompt delivery.

Finally, from the whole description it is clear how the described motorcycle 100 defines the application of a method which allows to carry out a two levels maintenance process of said electric motorcycles 100.

More precisely, the method comprises at least three essential steps which can be synthetized in the following three points, in which the second point, the characterizing one, is divided in seven detailed steps.

1. Individuation of a malfunctioning or failure in an electric motorcycle 100 which could be due to the "block of electric components" 110.

2. Delivery of the motorcycle to a not specialized, capillary diffused, site (for example a sales point) in which the operator carries out the following steps:
   a. lifting the rear portion of the electric motorcycle 100;
   b. exclusion of the rear suspension 150 of the electric motorcycle 100, thus allowing the rear fork, which remains constrained to the frame of the electric motorcycle 100 by means of the rotating constraint 141;
   c. rotation of said rear fork with enough amplitude to lower the rear wheel up to provide a passage through which it is possible to access to the compartment arranged in the lower portion of the electric motorcycle 100, compartment which, in the normal closed configuration, is in front of the rear wheel of the electric motorcycle 100, and so not accessible from rear;
   d. removal of the "block of electric components" 1-10 housed in said compartment arranged in the lower portion of the electric motorcycle 100;
   e. substitution of the "block of electric components" 1-10 with another functioning "block of electric components" 1-10;
   f. closing the electric motorcycle 100 by lifting the rear wheel up to restore its nominal position suitable for the drive of the vehicle and restoration of the correct function of the suspension 150;
   g. verification that the failure or malfunctioning is no more present and let the user leave;

3. shipment of the "block of electric components" 1-10 to a centralized and specialized maintenance site for repair.

The performance of these fundamental three steps, and in particular of the second one, characterizes a method which allows to carry out the a very simple, efficient and economic maintenance processes for electric motorcycles, thus contributing to overcome one of the causes of the current little diffusion of the electric motorcycles.

The invention claimed is:

1. An electric motorcycle (100), wherein a rigid block of electric components (110) comprises at least a battery pack (111) and a BMS (Battery Management System 112), wherein said rigid block of electric components (110) is removable from said electric motorcycle (100), thus maintaining rigidly contained all mechanic and electric connections between said battery pack (111), said BMS (1-12) and between other additional components of said block of electric components (110); and wherein said electric motorcycle (100) comprises a rear suspension (150), which is maintaining a rear wheel in a correct position suitable for the drive of the vehicle, and wherein said rear suspension (150) can be temporarily disabled to allow said rigid block of electric components (110) to be removed from or installed inside the electric motorcycle (100); and wherein said block of electric components (110) is also integrating the functions of a power control unit (113).

2. The electric motorcycle (100) according to claim 1, wherein an upper end (152) of the rear suspension (150) can be decoupled from a frame upper connection of the electric motorcycle (100) to allow said rear suspension (150) to rotate around a lower constraint (141).

3. The electric motorcycle (100) according to claim 1 wherein, when said motorcycle (100) is lifted from the ground and said operating function of the rear suspension (150) is disabled, a rear fork (140) rotates freely around the lower constraint (141) on the frame and allows the rear wheel to be lowered enough to provide a passage through which it is possible to access to a compartment arranged in a lower portion of said electric motorcycle (100) from the rear of the electric motorcycle (100).

4. A method for repairing an electric motorcycle (100) as described by claim 1, which can be carried out by a not specialized maintenance site, whenever a malfunctioning or failure inside the block of electric components (1-10) is detected; said method comprises the following steps:
   a. lifting the rear portion of the electric motorcycle (100);
   b. disabling the rear suspension (150) of the electric motorcycle (100), thus allowing the rear fork (140), which remains constrained to the frame of the electric motorcycle (100) by means of the rotating lower constraint (141), to rotate sufficiently to lower the rear wheel and to provide a passage to allow access from the rear to the compartment located in the lower portion of the electric motorcycle (100); wherein said compartment which, in a normal closed configuration, is in the front of the rear wheel of the electric motorcycle (100), and is not accessible from the rear;
   c. removing a malfunctioning block of electric components (1-10) housed inside said compartment located in the lower portion of the electric motorcycle (100) through the passage provided by means of the preceding steps (a. and b.) related to the opening of the electric motorcycle (100);
   d. replacing the removed block of electric components (1-10) with functioning block of electric components (1-10);
   e. lifting the rear wheel to reach its operating position suitable for the drive of the motorcycle and repositioning the suspension (150) in the configuration suitable for the drive of the vehicle;
   f. verifying that the malfunction or failure is no longer present.

* * * * *